United States Patent Office 3,466,296
Patented Sept. 9, 1969

3,466,296
PROCESS FOR THE PREPARATION OF ALKYL 3,5-DISUBSTITUTED-ISOXAZOLE-4-CARBOXYLATES
Dean C. Plemmons, West Chester, Pa., assignor to American Home Products Corporation, New York, N.Y., a corporation of Delaware
No Drawing. Filed May 16, 1967, Ser. No. 638,759
Int. Cl. C07d 85/22; A61k 25/00
U.S. Cl. 260—307                                           15 Claims

ABSTRACT OF THE DISCLOSURE

Alkyl 3,5-disubstituted-isoxazole-4-carboxylates (I) are prepared by an improved process comprising condensing a hydroxamoyl chloride (II) with an alkyl acylacetate (III) in the presence of a trialkylamine. Higher yields are obtained if an inert dehydrating agent is added to the reaction mixture. An optional hydrolysis after-step is a preferred embodiment, which leads to the 4-carboxylic acids corresponding to (I). The products of the processes are valuable intermediates, especially useful to prepare synthetic penicillins, such as, for example, oxacillin, cloxacillin and dicloxacillin.

---

This invention relates to the preparation of organic compounds useful as chemical intermediates, especially in the preparation of synthetic medicinals. More particularly it is concerned with the synthesis of alkyl 3,5-disubstituted-isoxazole-4-carboxylates of Formula I:

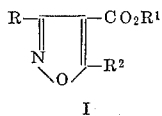

I wherein:

R is phenyl, monochlorophenyl, dichlorophenyl, or alkyl of from about 1 to about 6 carbon atoms;
$R^1$ is alkyl of from about 1 to about 6 carbon atoms; and
$R^2$ is phenyl or alkyl of from about 1 to about 6 carbon atoms.

BACKGROUND OF THE INVENTION

Compounds of Formula I are useful to prepare synthetic, therapeutically active penicillins. Thus if methyl 3-(2,6-dichlorophenyl)-5-methylisoxazole-4-carboxylate is hydrolyzed to the corresponding 4-carboxylic acid, then the carboxylic acid group is converted to an acyl halide group, with, for example, thionyl chloride, there is obtained 3-(2,6-dichlorophenyl) - 5 - methylisoxazole-4-carbonyl chloride, a compound which can be condensed with 6-aminopenicillanic acid to form 3-(2,6-dichlorophenyl)-5-methylisoxazolylpenicillin, also known as dicloxacillin, a synthetic drug of well known clinical value in the oral treatment of staphylococcal infection. Similarly, other compounds of Formula I are useful to make other synthetic penicillins. For example methyl 5-methyl-3-phenylisoxazole-4-carboxylate is an intermediate in the synthesis of oxacillin and methyl 3-(2-chlorophenyl)-5-methylisoxazole-4-carboxylate is an intermediate in the synthesis of cloxacillin.

While alkyl 3,5 - disubstituted-isoxazole-4-carboxylates are relatively simple starting materials in the preparation of complex synthetic penicillins, they are not easily obtainable, especially on a large scale, and thus are expensive. It has been proposed, for example, to provide them by a means comprising condensation of an alkyl sodio-acylacetate and a benzohydroxamoyl chloride. This method suffers from several shortcomings, especially if large amounts of materials are to be prepared, among which can be mentioned, for example, the handling of sodium metal (which involves safety hazards) in forming the sodio-acylacetate derivative and the need to remove large amounts of heat generated by the reaction mixture. Thus there is clearly a need for a means to provide compounds of Formula I, which means would not require either the use of metallic sodium or the specialized equipment required on a plant-scale to remove heat generated during the reaction. It has now been surprisingly found that the desired compounds can be provided if the condensation is carried out between a hydroxamoyl chloride and an alkyl acylacetate (not the sodio derivative thereof) when a mildly basic amine, such as a trialkylamine, is present in the reaction mixture. In this process the extra step of forming the sodio derivative is not needed. It is very surprising to find that such a process gives the desired isoxazole product since the expected product would be the entirely different compound resulting from O-alkylation of the enol form of the alkyl acylacetate. As is a matter of common knowledge to those skilled in the art, basic reagents, such as trialkyl amines cause the enol form of acetoacetic acid esters to be favored and reaction in an alkaline medium with the hydroxamoyl chloride should provide an O-alkylated compound, specifically an alkyl 3-(2-oximino-2-substituted-ethoxy)-3-substituted-acrylate, which cannot be cyclized to an isoxazole at all.

It is also surprising to find that only a limited class of mildly basic amines are useful in the novel means of this invention. If, for example, instead of the trialkylamines, attempts are made to substitute N,N-dimethylaniline, pyridine or quinoline, no product can be recovered from the reaction mixture. Thus the instant invention surprisingly meets a clearly felt need in providing an improved means to obtain alkyl 3,5-disubstituted-isoxazole-4-carboxylates.

It is accordingly a primary object of the instant invention to provide an improved means to obtain alkyl 3,5-disubstituted-isoxazole-4-carboxylates by condensing a hydroxyamoyl chloride with an alkyl acylacetate.

It is a further object to provide alkyl 3,5-disubstituted isoxazole-4-carboxylates with a minimum number of steps from commonly available starting materials.

It is a further object to provide a means to obtain alkyl 3,5-disubstituted-isoxazole-4-carboxylates without the need to use hazardous reagents or exothermic reaction mixtures, especially on a large scale.

DESCRIPTION OF THE INVENTION

These and other objects readily apparent to those skilled in the art are obtained by practice of the instant invention which is, in essence: a process for the preparation of an alkyl isoxazole-4-carboxylate of Formula I:

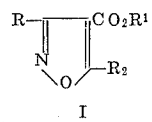

I wherein

R is phenyl, monochlorophenyl, dichlorophenyl or alkyl of from about 1 to about 6 carbon atoms;
$R^1$ is alkyl of from about 1 to about 6 carbon atoms; and
$R^2$ is phenyl or alkyl of from about 1 to about 6 carbon atoms, which comprises condensing a hydroxamoyl chloride of Formula II:

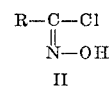

II wherein R is as hereinabove defined with an alkyl acylacetate of Formula III:

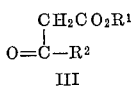

wherein $R^1$ and $R^2$ are as hereinabove defined, in the presence of a trialkylamine, wherein said alkyl groups contain from about 1 to about 6 carbon atoms, until condensation is substantially complete.

Special mention is made of a number of valuable embodiments contemplated by this invention. These are, respectively:

A process as defined hereinabove including the step of hydrolyzing said alkyl isoxazole-4-carboxylate in the presence of an alkali metal hydroxide until conversion to a isoxazole-4-carboxylic acid of the formula:

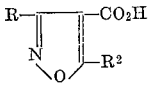

wherein

R is phenyl, monochlorophenyl, dichlorophenyl or alkyl of from about 1 to about 6 carbon atoms; and
$R^2$ is phenyl or alkyl of from about 1 to about 6 carbon atoms, is substantially complete and recovering said isoxazole-4-carboxylic acid.

A process as defined hereinabove wherein said condensation is carried out in the presence of an inert dehydrating agent. Higher yields often are provided in this embodiment.

A process as defined hereinabove wherein methyl 3-(2,6 - dichlorophenyl)-5-methylisoxazole-4-carboxylate is prepared by condensing 2,6-dichlorobenzohydroxamoyl chloride with methyl acetoacetate in the presence of triethylamine. This embodiment provides an intermediate in the synthesis of dicloxacillin.

A process for the preparation of the said intermediate for dicloxacillin wherein the condensation is carried out in the presence of anhydrous magnesium sulfate as the inert dehydrating medium. Especially good yields are provided in this embodiment.

A process as defined above including the hydrolysis after-step wherein methyl 3-(2,6-dichlorophenyl)-5-methylisoxazole-4-carboxylate is hydrolyzed with potassium hydroxide to form 3-(2,6-dichlorophenyl)-5-methylisoxazole-4-carboxylic acid.

A process as defined above wherein ethyl 3-(2,6-dichlorophenyl)-5-methylisoxazole-4-carboxylate is prepared by condensing 2,6-dichlorobenzohydroxamoyl chloride with ethyl acetoacetate in the presence of triethylamine. This embodiment also provides an intermediate useful to prepare dicloxacillin.

A process as defined above wherein methyl 3-(2-monochlorophenyl)-5-methylisoxazole-4-carboxylate is prepared by condensing 2-monochlorobenzohydroxamoyl chloride with methyl acetoacetate in the presence of triethylamine. This embodiment provides an intermediate useful to prepare cloxacillin.

A process as defined above wherein methyl 3-phenyl-5-methylisoxazole-4-carboxylate is prepared by condensing benzohydroxamoyl chloride with methyl acetoacetate in the presence of triethylamine. This embodiment provides an intermediate useful to prepare oxacillin.

A process as defined above including the hydrolysis after-step wherein methyl 3-phenyl-5-methylisoxazole-4-carboxylate is hydrolyzed with potassium hydroxide to form 3-phenyl-5-methyl-isoxazole-4-carboxylic acid.

A process as defined hereinabove wherein ethyl 3-phenyl-5-methylisoxazole-4-carboxylate is prepared by condensing benzohydroxamoyl chloride with ethyl acetoacetate in the presence of triethylamine.

A process as defined hereinabove wherein methyl 3-n-hexyl-5-methylisoxazole-4-carboxylate is prepared by condensing n-heptyl-hydroxamoyl chloride with methyl acetoacetate in the presense of triethylamine.

A process as defined above including the hydrolysis after-step wherein methyl 3-n-hexyl-5-methylisoxazole-4-carboxylate is hydrolyzed with potassium hydroxide to form 3-n-hexyl-5-methyl-isoxazole-4-carboxylic acid.

When used herein and in the appended claims, the term "alkyl" contemplates straight and branched chain hydrocarbon radicals containing from about 1 to about 6 carbon atoms. Illustrative of the alkyl groups thus are methyl, ethyl, propyl (n and iso), butyl (n, iso, sec., and tert.), n-pentyl, n-hexyl, 3-methylpentyl, and the like. The term "trialkylamine" includes those wherein the said alkyl groups contain from about 1 to about 6 carbon atoms. Illustrative trialkylamines thus are trimethylamine, triethylamine, tri-n-propylamine, tri-n-butylamine, tri-n-amylamine, tri-iso-amylamine, tri-n-hexylamine, and the like. It is preferred to use triethylamine because of economy and ease of handling. The term "inert dehydrating agent" is used in its classical sense and includes compounds capable of chemically or physically removing water from the reaction mixture. For example anhydrous salts or molecular sieves are especially useful. Illustrative of these are anhydrous magnesium sulfate, calcium sulfate, sodium sulfate, calcium chloride, and the like. It is preferred to use anhydrous magnesium sulfate.

The hydroxamoyl chlorides of Formula II can be obtained in a number of ways. For example, by treating an appropriate benzaldoxime, dissolved in chloroform, with a solution of chlorine in chloroform or, alternatively, with nitrosyl chloride.

The alkyl acylacetates of Formula III are readily available commercially or can be prepared by procedures well known to those skilled in the art. For example methyl- and ethyl acetoacetates are prepared according to procedures described in Organic Syntheses, col. vol. 1, 2nd edition (1941), p. 235.

In carrying out the instant process the hydroxamoyl chloride of Formula II is condensed with the alkyl acylacetate of Formula III in the presence of the trialkylamine at a temperature of from about −20° C. to about 50° C., preferably from about −10° C. to about 10° C., for about 1 hour to about 96 hours (longer times can be used, but there appears to be no advantage gained thereby), preferably for from about 4 to about 18 hours, until the reaction is substantially complete. While, especially with the lower alkyl acylacetates, it is not essential to use a diluent it is preferred to use a non-reactive inert organic solvent such as an aromatic hydrocarbon, for example, benzene, toluene, xylene and the like, or a chlorinated hydrocarbon such as chloroform or methylene chloride, and the like. Especially satisfactory results are obtained if methylene chloride or benzene are used as diluents. It is preferred to carry out the reaction in a system protected from atmospheric moisture. In one especially useful procedure, the alkyl acylacetate is suspended in about three times its weight of methylene chloride and about .6 part by weight of trialkylamine. If desired, about 0.3 part by weight (based on the alkyl acylacetate) of anhydrous magnesium sulfate is suspended in the reaction mixture. This then is cooled to 0° C. and maintained while a solution containing the stoichiometric quantity of the hydroxyamoyl chloride in about 2 parts by weight of methylene chloride is added dropwise during one hour. The temperature is maintained at 0° C. until condensation is substantially complete. The reaction is essentially complete within one hour after addition of the hydroxamoyl chloride, but longer reaction times, even up to about 24 hours, can be used to insure optimum yields. The product can be recovered in a variety of ways. For example, the mixture can be filtered and the organic filtrate can be washed with water, dried then concentrated by distillation of the solvents in a vacuum. The concentrate can be dissolved in a lower alcohol, such as ethanol and then crystallized by cooling. If desired it can be further purified by recrystallization from a solvent such as a mixture of ethanol and cyclohexane (1:1 by volume).

The hydrolysis after-step embodiment can be carried out on the recovered isoxazole of Formula I or, alternatively, the solution of the concentrate in the lower alkanol can be diluted with water and hydrolyzed. Hydrolysis is accomplished by the addition of an alkali metal hydroxide, such as sodium hydroxide or potassium hydroxide, to the mixture containing either resuspended or unisolated isoxazole of Formula I in a lower alkanol, such as ethanol, in the presence of about an equal volume of water and heating, preferably at reflux temperatures, the mixture until conversion of the alkyl 4-carboxylate group to the 4-carboxylic alkali metal salt derivative group is substantially complete. Adjustment of the pH of the salt solution to a value of about 1.5 causes the desired 4-carboxylic acid to to be precipitated (it begins to precipitate when the solution becomes acidic) and it can be recovered by filtration and purified further, if desired, by washing with water. These procedures are exemplified in detail hereinafter.

DESCRIPTION OF THE PREFERRED EMBODIMENTS

The following examples describe processes of the instant invention. They are given for the purpose of illustrating the invention but are not to be construed to limit it in any manner whatsoever.

Example 1.—Methyl 3-(2,6-dichlorophenyl) - 5 - methyl-isoxazole-4-carboxylate

Methyl acetoacetate, 45.7 g., 75 ml. of triethyl amine, 100 ml. of methylene chloride and 15 g. of anhydrous magnesium sulfate are placed in a 500 ml. reaction flask and the mixture is cooled to 0±5° C. The reaction temperature is maintained at 0° C., and a solution of 76.9 g. of 2,6-dichloro-benzohydroxamoyl chloride in 100 ml. of methylene chloride is added during one hour. The temperature then is maintained at 0° C. for an additional 18 hours. The product is isolated by filtering the reaction mixture, washing the precipitate twice with 50 ml. portions of methylene chloride and combining the washes with the filtrate. The combined organic layer is extracted twice with 100 ml. portions of water. The extracts are washed with 50 ml. of methylene chloride which is combined with the original filtrate. The organic layer is washed again with 100 ml. of water, then is concentrated to a volume of about 100 g. by distillation at 40–80° C. in a vacuum. One hundred milliliters of ethanol is added and the concentration to about 100 g. is repeated. The concentrate weight is adjusted to about 125 g. by adding ethanol to provide the "product-ethanol concentrate" and the mixture is heated to reflux then cooled to 25–35° C. during one hour, then is cooled to 0–5° C., kept for 1 hour, filtered and the collected precipitate is washed with 30 ml. of cyclohexane. The product is recrystallized from 80 ml. of a hot mixture of ethanol-cyclohexane (1:1 volume). The product is slurried at 0° C. for 1 hour, filtered, washed with 30 ml. of cyclohexane and dried at 50–55° C. There is obtained 64 g. of product, M.P. 113–115° C.

The preparation is repeated, without anhydrous magnesium sulfate, and substantially the same results are obtained, although the weight of recovered product is somewhat less than 64 g.

The preparation is repeated using benzene as a diluent in place of methylene chloride. Substantially the same results are obtained.

The procedure is repeated substituting stoichiometrically-equivalent amounts of trimethylamine, tri-n-propylamine and tri-n-hexylamine for triethylamine. Substantially the same results are obtained.

Example 2.—3-(2,6-dichlorophenyl)-5-methylisoxazole-4-carboxylic acid

Methyl 3-(2,6-dichlorophenyl)-5 - methylisoxazole - 4-carboxylate, 40.6 g., 75 ml. of ethanol and a solution containing 11.2 g. of potassium hydroxide in 35 ml. of water are refluxed for 7 hours. Water, 150 ml., then is added and the ethanol is removed by distillation to a vapor temperature of 90° C. The aqueous solution is washed with 50 ml. of toluene, slurried for 15 minutes at 50–60° C. with 1 g. of decolorizing charcoal and filtered through diatomaceous earth. The filtrate is diluted with 50 ml. of ethanol, cooled to 5–10° C. and the pH is adjusted to 1.8 by the dropwise addition of 15% hydrochloric acid during 15 minutes. The product is slurried for 30 minutes at 0–5° C., then is filtered and washed with water until free of chloride ion, then is dried at 50° C. There is obtained 36.7 g., M.P. 220–222° C.

The process is repeated substituting sodium hydroxide for potassium hydroxide. Substantially the same results are obtained.

Example 3.—Ethyl 3-(2,6-dichlorophenyl)-5-methyl-isoxazole-4-carboxylate

The procedure of Example 1 is repeated substituting ethyl acetoacetate for methyl acetoacetate and the product is obtained.

The "product-ethanol concentrate" from this example is treated with 100 ml. of water then hydrolyzed with potassium hydroxide according to Example 2 and the free acid is obtained without the need to have isolated the ethyl ester.

Example 4.—Methyl 3-(2-monochlorophenyl)-5-methyl-isoxazole-4-carboxylate

The procedure of Example 1 is repeated substituting a stoichiometrically-equivalent amount of 2-monochlorobenzohydroxamoyl chloride for 2,6-dichlorobenzohydroxamoyl chloride and the product is obtained.

Example 5.—Methyl 3-phenyl-5-methylisoxazole-4-carboxylate

The procedure of Example 1 is repeated substituting benzohydroxamoyl chloride for 2,6-dichlorobenzohydroxamoyl chloride and the product, M.P. 79–80° C., is obtained.

Example 6.—3-phenyl-5-methylisoxazole-4-carboxylic acid

Methyl 3-phenyl-5-methylisoxazole-4-carboxylate is hydrolyzed by the procedure of Example 2 and the product, M.P. 191.5–193° C., is obtained.

Example 7.—Ethyl 3-phenyl-5-methylisoxazole-4-carboxylate

Ethyl acetoacetate is used in place of methyl acetoacetate in the procedure of Example 5 and the product is obtained.

Example 8.—Methyl 3-n-hexyl-5-methylisoxazole-4-carboxylate n-Heptylhydroxamoyl chloride, 56.0 g., is substituted for 2,6-dichlorobenzohydroxamoyl chloride in the procedure of Example 1 and the product is obtained.

Example 9.—3-n-hexyl-5-methylisoxazole-4-carboxylic acid

Methyl 3-n-hexyl-5-methylisoxazole - 4 - carboxylate is hydrolyzed by the procedure of Example 2 and the product, M.P. 86.5–87.5° C., is obtained.

Example 10

The procedures of Examples 1 to 9 are used with stoichiometrically-equivalent amounts of appropriately-substituted hydroxamoyl chlorides and alkyl acylacetates and the following alkyl 3-5-disubstituted-isoxazole-4-carboxylates and 3,5-disubstituted-isoxazole-4-carboxylic acids are obtained:

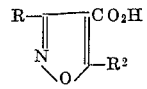

| R | R¹ | R² |
|---|---|---|
| CH₃ | n-CH₃(CH₂)₄CH₂ | CH₃ |
| CH₃ | CH₃ | n-CH₃(CH₂)₄CH₂ |
| (CH₃)₂CH | CH₃ | (CH₃)₂CH |
| 2-chlorophenyl | CH₃ | CH₃ |
| 4-chlorophenyl | CH₃ | CH₃ |
| 2,3-dichlorophenyl | CH₃ | CH₃ |
| 3,4-dichlorophenyl | CH₃ | CH₃ |
| 2,6-dichlorophenyl | CH₃ | CH₃ |
| 2-chlorophenyl | H | CH₃ |

Example 11.—Ethyl 3,5-diphenylisoxazole-4-carboxylate

Ethyl benzoylacetate is used in place of methyl acetoacetate and benzohydroxamoyl chloride is used in place of 2,6-dichlorobenzohydroxamoyl chloride in the procedure of Example 1 and the product, M.P. 50–51° C., is obtained.

Example 12.—3,5-diphenylisoxazole-4-carboxylate

Ethyl 3,5-diphenylisoxazole-4-carboxylate is hydrolyzed by the procedure of Example 2 and the product, M.P. 236–238° C., is obtained.

I claim:
1. A process for the preparation of an alkyl isoxazole-4-carboxylate of the formula:

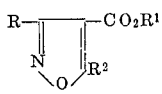

wherein

R is phenyl, monochlorophenyl, dichlorophenyl or alkyl of from about 1 to about 6 carbon atoms;
R¹ is alkyl of from about 1 to about 6 carbon atoms; and
R² is phenyl or alkyl of from about 1 to about 6 carbon atoms, which comprises contacting within a temperature range at which condensation occurs at least the stoichiometric quantity of a hydroxamoyl chloride of the formula:

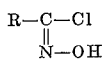

wherein R is as hereinabove defined with an alkyl acylacetate of the formula

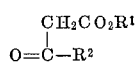

wherein R¹ and R² are as hereinabove defined, in the presence of a trialkylamine, wherein said alkyl groups contain from about 1 to about 6 carbon atoms.

2. A process according to claim 1 including the step of heating within a temperature range at which hydrolysis occurs said alkyl isoxazole-4-carboxylate in the presence of an alkali metal hydroxide selected from aqueous sodium hydroxide or aqueous potassium hydroxide to convert it to a isoxazole-4-carboxylic acid of the formula $$\begin{array}{c} R-\overset{}{\underset{N}{\bigsqcup}}-CO_2H \\ \phantom{R}\diagdown O \diagup -R^2 \end{array}$$

wherein

R is phenyl, monochlorophenyl, dichlorophenyl or alkyl of from about 1 to about 6 carbon atoms; and
R² is phenyl or alkyl of from about 1 to about 6 carbon atoms, and recovering said isoxazole-4-carboxylic acid.

3. A process according to claim 1 wherein said condensation is carried out in the presence of an inert dehydrating agent which is an anhydrous salt or a molecular sieve.

4. A process according to claim 1 wherein methyl 3-(2,6-dichlorophenyl)-5-methylisoxazole-4-carboxylate is prepared by condensing 2,6-dichlorobenzohydroxamoyl chloride with methyl acetoacetate in the presence of triethylamine.

5. A process according to claim 4 wherein the condensation is carried out in the presence of anhydrous magnesium sulfate.

6. A process according to claim 2 wherein methyl 3-(2,6-dichlorophenyl)-5-methylisoxazole-4-carboxylate is hydrolyzed with potassium hydroxide to form 3-(2,6-dichlorophenyl)-5-methylisoxazole-4-carboxylic acid.

7. A process according to claim 1 wherein ethyl 3-(2,6-dichlorophenyl)-5-methylisoxazole-4-carboxylate is prepared by condensing 2,6-dichlorobenzohydroxamoyl chloride with ethyl acetoacetate in the presence of triethylamine.

8. A process according to claim 1 wherein methyl 3-(2-monochlorophenyl)-5-methylisoxazole-4-carboxylate is prepared by condensing 2-monochlorobenzohydroxamoyl chloride with methyl acetoacetate in the presence of triethylamine.

9. A process according to claim 1 wherein methyl 3-phenyl-5-methylisoxazole-4-carboxylate is prepared by condensing benzohydroxamoyl chloride with methyl acetoacetate in the presence of triethylamine.

10. A process according to claim 2 wherein methyl 3-phenyl-5-methylisoxazole-4-carboxylate is hydrolyzed with potassium hydroxide to form 3-phenyl-5-methylisoxazole-4-carboxylic acid.

11. A process according to claim 1 wherein ethyl 3-phenyl-5-methylisoxazole-4-carboxylate is prepared by condensing benzohydroxamoyl chloride with ethyl acetoacetate in the presence of triethylamine.

12. A process according to claim 1 wherein methyl 3-n-hexyl-5-methylisoxazole-4-carboxylate is prepared by condensing n-heptyl hydroxamoyl chloride with methyl acetoacetate in the presence of triethylamine.

13. A process according to claim 2 wherein methyl 3-n-hexyl-5-methylisoxazole-4-carboxylate is hydrolyzed with potassium hydroxide to form 3-n-hexyl-5-methylisoxazole-4-carboxylic acid.

14. A process according to claim 1 wherein ethyl 3,5-diphenylisoxazole-4-carboxylate is prepared by condensing ethyl benzoylacetate with benzohydroxamoyl chloride in the presence of triethylamine.

15. A process according to claim 2 wherein ethyl 3,5-diphenylisoxazole-4-carboxylate is hydrolyzed with potassium hydroxide to form 3,5-diphenylisoxazole-4-carboxylic acid.

References Cited

UNITED STATES PATENTS 2,996,501   8/1961   Doyle et al. _____ 260—239.1

(Other references on following page)

OTHER REFERENCES

Sykes, "Guidebook to Mechanism in Organic Chemistry," Wiley (1961), pp. 52 and 55.

Merck Index, 7th edition (1960), p. 630.

NICHOLAS S. RIZZO, Primary Examiner

R. V. RUSH, Assistant Examiner

U.S. Cl. X.R.

260—999